Feb. 22, 1938.  F. J. SHOOK  2,109,437
TIRE BUILDING APPARATUS
Filed Jan. 4, 1934   5 Sheets-Sheet 3
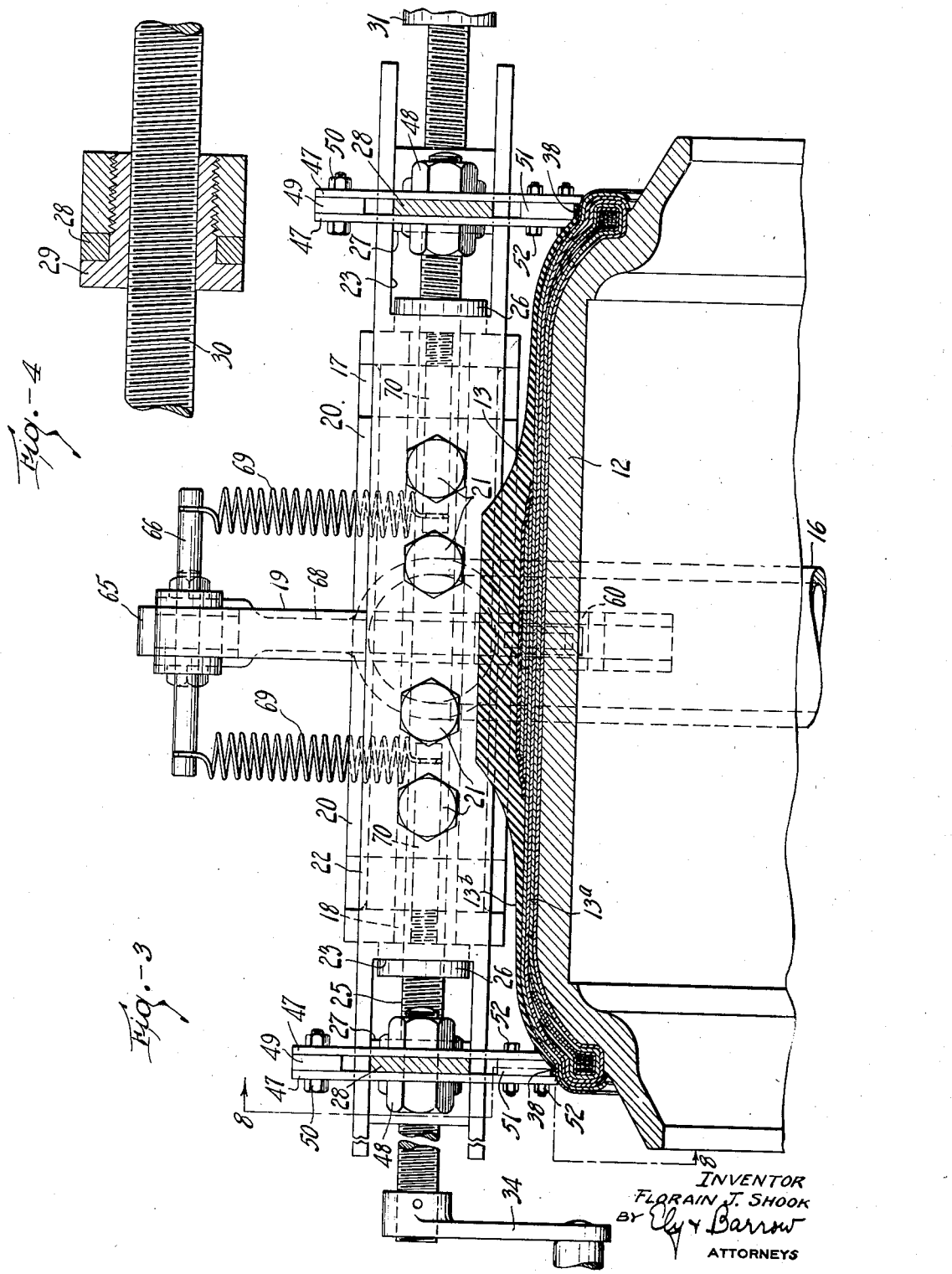
INVENTOR
FLORAIN J. SHOOK
BY Ely & Barrow
ATTORNEYS Feb. 22, 1938.                F. J. SHOOK                2,109,437
                        TIRE BUILDING APPARATUS
                         Filed Jan. 4, 1934              5 Sheets-Sheet 4
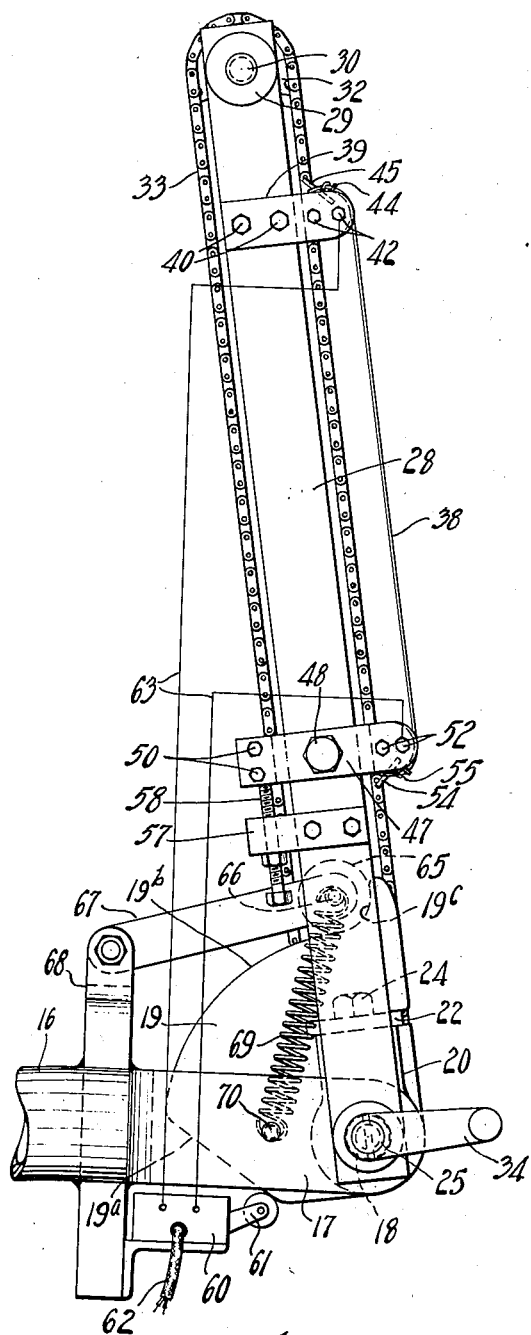
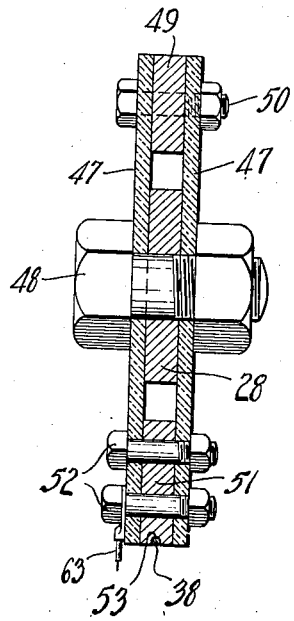
Fig.-6
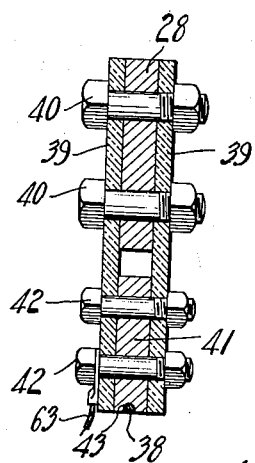
Fig.-7
Fig.-5
INVENTOR
FLORAIN J. SHOOK
BY
Ely & Barrow
ATTORNEYS Feb. 22, 1938.  F. J. SHOOK  2,109,437
TIRE BUILDING APPARATUS
Filed Jan. 4, 1934   5 Sheets-Sheet 5

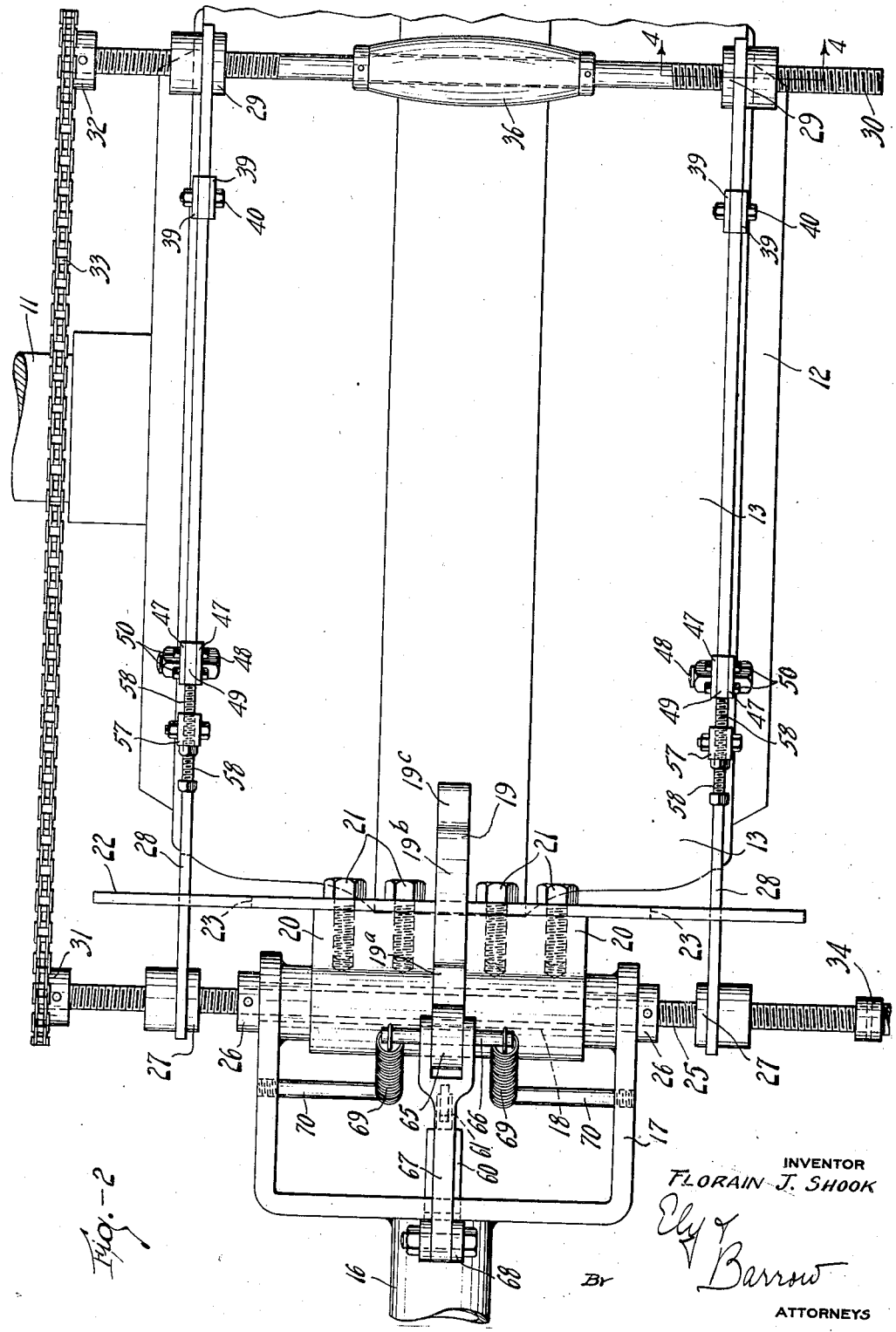

INVENTOR
FLORAIN J. SHOOK
BY Ely & Barrow
ATTORNEYS

Patented Feb. 22, 1938

2,109,437

UNITED STATES PATENT OFFICE 2,109,437

TIRE BUILDING APPARATUS

Florain J. Shook, Akron, Ohio, assignor to National Rubber Machinery Company, Akron, Ohio, a corporation of Ohio Application January 4, 1934, Serial No. 705,204

12 Claims. (Cl. 164—36)

This invention relates to tire building apparatus, and more especially it relates to apparatus for severing surplus stock from those marginal portions of the side walls of a tire that are disposed nearest the beads of the latter, during the fabrication of a pneumatic tire casing.

The invention is designed primarily for operation upon substantially flat, pulley-band tires such as are built upon collapsible drums, and it is useful in trimming surplus sidewall stock from sidewalls that are integral with the tread-slab of the tire, as well as those that are separate therefrom.

In the manufacture of pneumatic tire casings, especially those having integral tread-slab and sidewalls, it is practically impossible to achieve uniformity in the positioning of the lateral margins of the sidewalls due to varying conditions of temperature and humidity which affect the plasticity of the rubber stock, and due to varying pressure of stitching tools on different tire building machines.

Briefly stated, the present invention overcomes the aforementioned difficulties by the use of a tread and sidewall slab of slightly greater width than normally required, and, after said slab is stitched in place on the tire carcass, severs the surplus stock from the lateral margins of the slab.

The chief object of the invention is to achieve uniformity of the margins of the sidewalls of a pneumatic tire, adjacent the beads thereof. Another important object of the invention is to provide improved and efficient apparatus for severing surplus stock from the marginal portions of the sidewalls of a tire, after said side walls are mounted on the latter, during the manufacture of the tire. Further objects include the saving of time and labor in the trimming of the margins of the side walls of a tire; the provision of apparatus that is readily adaptable for use upon tires of various widths and various bead diameters; and the securing of improved adhesion of the side walls to the carcass of a tire, especially at the lateral margins of said side walls. Other objects will be manifest.

Of the accompanying drawings,

Figure 2 is a plan view thereof, on a larger scale, a part being broken away;

Figure 3 is a section on the line 3—3 of Figure 1, on a larger scale;

Figure 4 is a section on the line 4—4 of Figure 2;

Figure 5 is a side elevation of a portion of the apparatus shown in Figure 1, on a larger scale, in its raised or inoperative position;

Figure 6 is a section on the line 6—6 of Figure 1;

Figure 7 is a section on the line 7—7 of Figure 1; and

Figure 1:
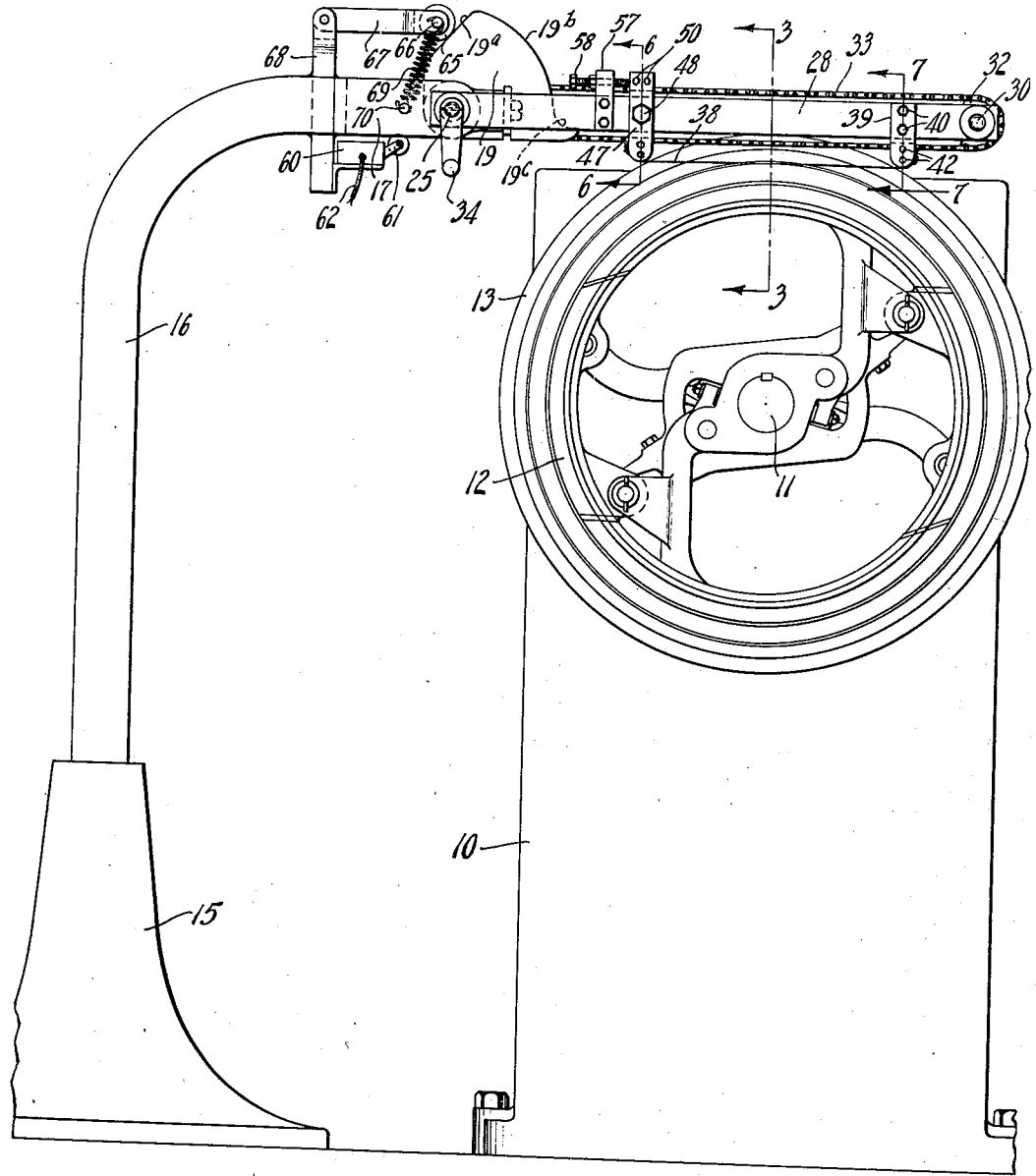
Figure 1 is a side elevation of apparatus embodying the invention, in its preferred form, in operative position, and the work being operated upon.
Figure 8:
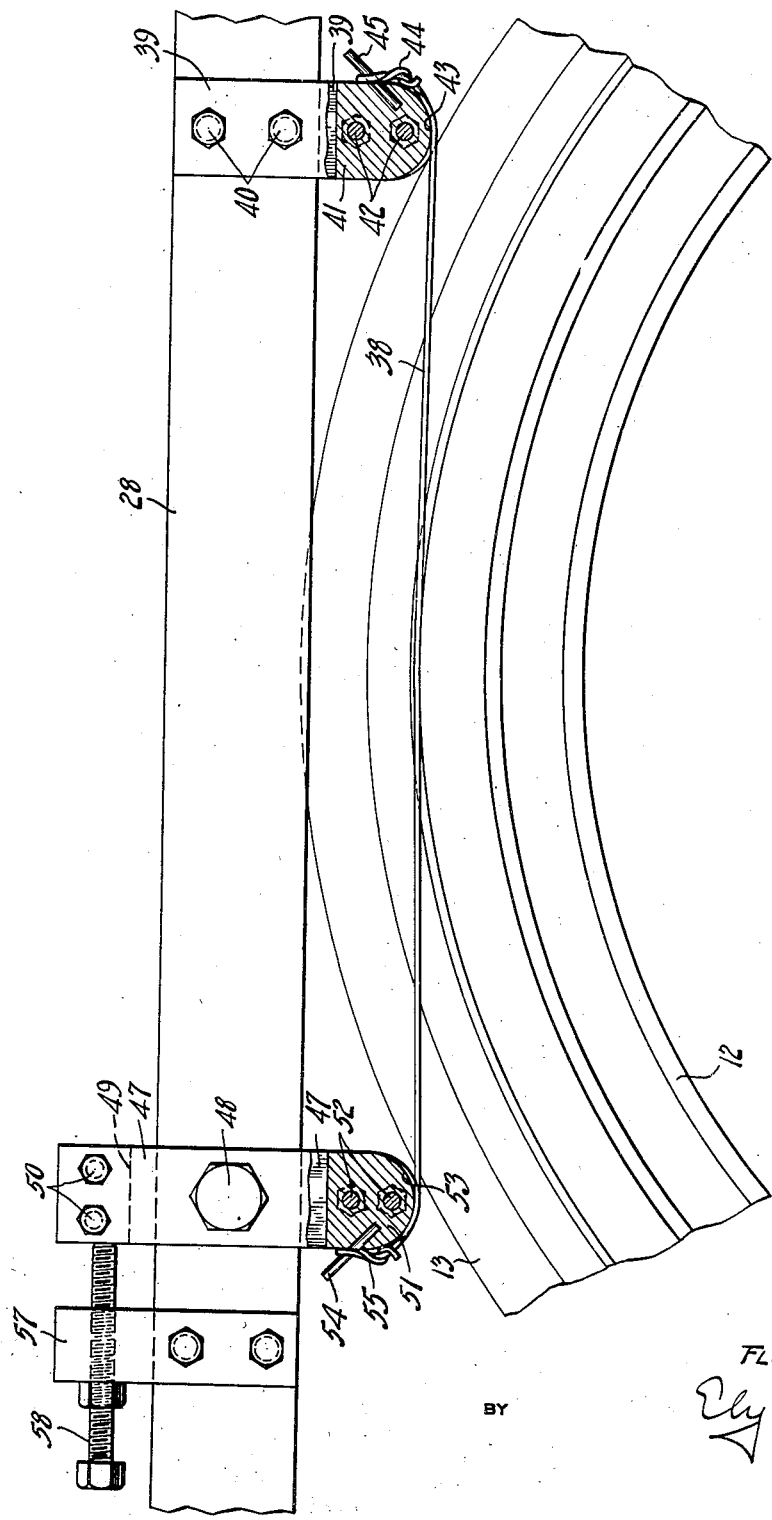
Figure 8 is a section on the line 8—8 of Figure 3.

Referring to Figure 1 of the drawings, there is shown therein a tire building machine 10 comprising the usual rotatable spindle 11 that carries a collapsible tire building form or drum 12 of known or preferred construction. The work consisting of a tire 13 is shown on the peripheral surface of the drum 12. As is best shown in Figure 3, the tire 13 comprises the usual carcass 13a of rubberized fabric plies, and a tread and sidewall slab 13b of unvulcanized rubber composition. Although shown herein as integral, the tread slab and sidewall strips may be separate pieces.

Positioned beside the tire building drum 12 is a pedestal base 15, and rising therefrom is a supporting post 16 that has its upper end portion bent at right angles so as to extend toward said drum, at a point slightly above the latter. Secured to the upper end of post 16 is an extension 17 that is formed as a yoke, and mounted in the outer ends of the arms thereof is a bearing bushing 18. Journaled upon the bushing 18 is a cam 19, which cam is formed with relatively large hub portions 20, 20 on each side thereof. Secured to said hub portions 20 by bolts 21, 21 is a yoke 22, which yoke is disposed parallel to bushing 18, its end portions extending well beyond said hub portions and being formed with respective longitudinally arranged, open-end slots 23, as is most clearly shown in Figure 3.

Journaled in the bushing 18 is a shaft 25 having its end portions formed with right-hand and left-hand screw threads respectively, as shown in Figures 2 and 3. Respective collars 26, 26 mounted on the shaft at each side of yoke 17 prevent relative longitudinal movement of the shaft in the said bushing 18. Threaded onto the opposite end portions of shaft 25 are respective nuts 27, 27 that are carried at the adjacent ends of a pair of parallel, elongate arms 28, 28, which arms extend transversely through the respective slots 23 of yoke 22. At their free ends the arms 28 carry respective nuts 29 that are threaded upon right-hand and left-hand screw threads formed upon the opposite end portions of a shaft 30, which shaft is substantially identical with shaft 25. At one of their adjacent ends the shafts 25, 30 are provided with respective sprockets 31, 32 that are connected by sprocket chain 33. The opposite end of shaft 25 is provided with hand crank 34 for manually rotating said shaft, the arrangement being such that rotation of shaft 25 causes similar concurrent rotation of shaft 30 with the result that arms 28 are moved toward or away from each other while maintaining their parallel relationship at all times.

The arms 28 have a determinate, raised, inoperative position as is shown in Figure 5, and a lowered operative position such as is shown in Figures 1, 2, 3 and 8. The arms are manually moved to and from the positions mentioned, and to this end a hand-grip member 36 is mounted upon the medial region of shaft 30, preferably being freely rotatable thereon so that there is no tendency to rotate the shaft 30 when the member 36 is grasped to raise or lower said arms. Since the arms 28 extend through yoke 22, it will be evident that cam 19 will move with the said arms when they are being raised or lowered, said cam swiveling on bushing 18 and shaft 25 turning angularly within said bushing. The arrangement prevents relative movement of the shaft 25 and arms 28 during the raising and lowering of said arms whereby their position with relation to each other is not altered.

Each arm 28 carries a stock-trimming member, which members are of identical construction so that a description of one of them will be sufficient. The trimming element per se consists of a length of wire 38 that is about $\frac{1}{16}$ in. diameter and made of corrosion-resisting material such as the nickel-chromium alloy known as "nichrome". The wire 38 is parallel to the arm 28, in spaced relation to one edge thereof, which edge is lowermost in the lowered, operative position of the arm.

The wire 38 is electrically insulated from the arm 28, being carried between a pair of brackets mounted thereupon. The bracket adjacent the free end of arm 28 comprises a pair of plates 39, 39 of dielectric material such as fibre, hard rubber or the like, which plates are secured to opposite sides of the arm by bolts 40, and extend beyond the lower edge of said arm whereat a metal block 41 is secured between them by bolts 42. Said block has an arcuate lower margin that is formed with a groove 43, Figure 7, to receive wire 38, the end of the latter being formed with a loop or eye 44 that engages a stud 45 projecting from said block 41, said stud thus providing an anchorage for one end of the wire.

The other wire-supporting bracket is positioned nearer the pivoted end of the arm 28 and comprises a pair of dielectric plates 47, 47 that are pivotally secured on opposite sides of the arm by a hinge-bolt 48. The plates 47 extend beyond the upper edge of arm 28 whereat a metal block 49 is secured between them by bolts 50, 50. The plates 47 also extend beyond the lower margin of arm 28 where they are provided with a block 51 that is secured between them by bolts 52. The block 51 is similar in all respects to block 41, and comprises an arcuate groove 53 which receives wire 38, and a stud 54 over which an eye 55 at the end of the wire is looped.

The bracket comprising plates 47 may be moved angularly about its pivotal support 48 to impart tension to wire 38, and to this end a bracket 57 is mounted upon arm 28 beside the aforementioned bracket, and provided with an adjusting bolt 58 that engages block 49 of the other bracket.

The wires 38 are so arranged that when the arms 28 are in their lowered, operative position, said wires will extend tangentially across the marginal portions of the respective side walls of the tire 13, and as the latter rotates, will cut the plastic, unvulcanized composition thereof through to the underlying fabric, thus severing the surplus marginal portions of said side walls, which surplus stock thereafter is removed. Usually the weight of the arms 28 and mechanism carried thereby, supplemented by yielding spring means presently to be described, is sufficient to effect the cutting operation described, but this pressure may be increased by pressure applied manually upon shaft 30, if desired.

In case more rapid trimming is desired, the wires 38 may be electrically heated. Means for electrically heating the wires 38 is shown somewhat diagrammatically in Figure 5 wherein 60 is a switch box, 61 is the operating lever thereof, 62 is a power line thereto, and 63, 63 are respective conductor wires extending from said switch box to opposite ends of each wire 38, having connection with the latter through the bolts 42, 52 by which the respective wire-supporting blocks 41, 51 are mounted. Electric current delivered through wires 38 is such as not to heat the latter above the charring temperature of fabric, say 300° F. The automatic operation of switch 60 is one function of cam 19, the construction of which will now be described.

The cam 19 comprises a flat surface 19$^a$ that is disposed obliquely with relation to the axis of the cam, and an arcuate surface 19$^b$ that is contiguous with surface 19$^a$ and is concentric with the said axis of the cam. The arcuate surface 19$^b$ terminates in a reverse curve 19$^c$ that constitutes a hook-shaped abutment. Riding upon the aforesaid cam surfaces is a roller 65 that is journaled upon a non-rotatable shaft 66 in the free end of an arm 67 that is pivotally mounted at its other end in a bracket 68 secured to the upper end of post 16, behind yoke 17. The bracket 68 has a portion thereof that extends below post 16 and constitutes a support for the switch box 60. The shaft 66 projects laterally from opposite sides of arm 67, and respective tension springs 69, 69 are connected thereto, the other ends of said tension springs being connected to respective studs 70, 70 projecting from the respective arms of yoke 17. The arrangement is such that the roller 65 normally is yieldingly urged against cam 19.

Figures 1 and 5 show the positions of the cam 19 in the respective operative and inoperative positions of the arms 28. It will be seen that in the operative position shown in Figure 1, the cam 19 is clear of operating lever 61 of switch 60, with the result that the switch is closed and current flows to wires 38 to heat the same. In the inoperative position of the arms 28 shown in Figure 5, cam surface 19$^a$ is in engagement with operating lever 61, whereby the switch 60 is held in open position and no current flows to wires 38. In the operative position of the apparatus shown in Figure 1, the cam roller 65 bears upon inclined flat cam surface 19$^a$ with the result that the springs 69 yieldingly urge arms 28 downwardly, whereby the wires 38 are pressed against the work. When the arms 28 are raised from the operative position shown in Figure 1 to the inoperative position shown in Figure 5, the arcuate cam surface 19$^b$ first moves under roller 65 so that the latter no longer urges said arms downwardly, and then after said arms are moved over center past vertical position, the abutment 19$^c$ engages roller 65 and further movement of said arms is prevented. The arrangement is such as to provide a determinate inoperative position for the trimming apparatus, yet permits such freedom of movement of the apparatus in operative position that it will operate upon tires of various diameters with equal facility.

In the operation of the apparatus, the tire 13 is built upon the drum 12 in any known or preferred manner while the arms 28 are in the elevated, inoperative position shown in Figure 5. After the tread and sidewall slab 13$^b$ has been mounted upon the tire carcass 13$^a$ and stitched in place thereon, the operator causes the drum 12 to rotate and then lowers the arms 28 to the operative position shown in Figures 1, 2 and 8 whereby the wires 38 rest upon the marginal portions of the sidewalls of the tire and the switch 60 is closed to effect heating of said wires if they are to be heated. It requires but a few revolutions of the drum 12 for the wires 38 to cut through the sidewalls of the tire, and during this interval the operator may busy himself with other tasks since the wire will not cut through the fabric of the underlying carcass 13$^a$, or char it if the wire is heated. The arms 28 are then moved to the inoperative position shown in Figure 5, thus opening switch 60 and permitting wires 38 to cool. The severed, surplus sidewall stock is then stripped from the tire and disposed of, after which the tire may be removed from the drum. This completes a cycle of operation.

The use of the wires 38 in heated condition so softens and renders tacky the margins of the side walls of the tire that superior adhesion of the unvulcanized tire stock is obtained at this point and ply separation rendered less likely to occur. The invention is of simple construction, is economical in operation, produces tires of superior construction and of uniform appearance and achieves the other advantages set out in the foregoing statement of objects.

Modification may be resorted to without departing from the spirit of the invention or the scope of the appended claims, which are not limited wholly to the specific construction shown and described.

What is claimed is:

1. Tire building apparatus comprising a cutting tool consisting of a wire, means for supporting said tool in an inoperative position removed from a tire and in an operative position in engagement with a tire, and means for electrically heating said wire solely when it is in operative position.

2. Tire building apparatus comprising a cutting tool consisting of a wire, brackets to which the respective ends of said wire are attached, a supporting structure for said brackets, at least one of the latter being pivotally mounted thereon, and means for angularly moving the pivotally mounted bracket on its support to maintain the wire in taut condition.

3. Tire building apparatus comprising a cutting tool consisting of a metal wire, metal blocks to which the respective ends of said wire are attached, brackets of dielectric material supporting said blocks, a swinging arm on which said brackets are mounted, and electrical circuit having connection with said blocks whereby the wire may be heated by its own electrical resistance.

4. A combination as defined in claim 3 including an electrical switch in the electrical circuit, and means for automatically operating the switch according to the angular position of the swinging arm whereby the wire is heated solely while in operative position.

5. Tire building apparatus comprising a rotatable form on which a tire casing may be built, a pair of parallel arms swingable in respective planes transverse to the axis of said form, respective cutting tools carried by said arms, each of said tools comprising a metal wire disposed longitudinally of the arm in spaced relation to one margin thereof, and means for concurrently adjusting said arms from and toward each other while maintaining them equi-distant from the central plane of a tire casing under construction.

6. Tire building apparatus comprising a pair of cutting tools adapted to operate against the periphery of a rotating tire casing, respective parallel, pivotally mounted, interconnected arms upon which said tools are mounted, said arms having an inoperative position remote from the tire and an operative position wherein the tools engage the tire, and a yielding means operating upon the arms solely in their operative position to urge the tools against the tire.

7. A combination as defined in claim 6 including means for concurrently moving the arms from and toward each other to vary the distance between the cutting tools while maintaining the latter equi-distant from the central plane of the tire.

8. Tire building apparatus comprising a pair of cutting tools adapted to operate against the periphery of a rotating tire casing, respective parallel, pivotally mounted arms upon which said tools are mounted, means for adjusting said arms laterally with relation to each other, a yoke engaging said arms so as to be moved thereby when they are swung on their pivot, a cam associated with said yoke, and yielding means bearing against said cam, the latter being so constructed and arranged that the yielding means urges the tools toward the tire in the operative position of the arms.

9. A combination as defined in claim 8 including an abutment formed on the cam and adapted to engage the yielding means in one position of the arms to define a determinate inoperative position for the arms.

10. Tire building apparatus comprising a pair of cutting tools adapted to operate against the periphery of a rotating tire casing, respective parallel, pivotally mounted, interconnected arms upon which said tools are mounted, a cam so connected to said arms as to be moved angularly when said arms are swung on their pivot, an electrical circuit connected with said tools for heating the same, and a switch in said electrical circuit so positioned as to be operated by said cam.

11. Tire building apparatus comprising a pair of cutting tools consisting of metal wires, respective parallel, pivotally mounted arms upon which said wires are carried, in spaced relation to one margin thereof, means for adjusting said arms laterally relatively of each other to vary the distance between the wires, a cam so connected to said arms as to be turned angularly when the arms are swung on their pivots, a spring-pressed cam roller engaging said cam, the latter being so constructed and arranged that the spring-pressed roller will urge the wires against the work in one position of the arms, means for electrically heating the wires, and means operated by the cam for controlling said heating means.

12. Tire building apparatus comprising a rotatable drum upon which a tire casing may be built, a pivoted arm movable angularly parallel to the plane of the drum, a cutting tool consisting of a taut wire carried by said arm and disposed parallel thereto, and means for urging said wire against the perimeter of a tire casing while the latter is backed by the rotating drum.

FLORAIN J. SHOOK.